C. FRIEDRICH.
LUMINOUS HAIR LINE.
APPLICATION FILED SEPT. 20, 1917.
1,302,353. Patented Apr. 29, 1919.
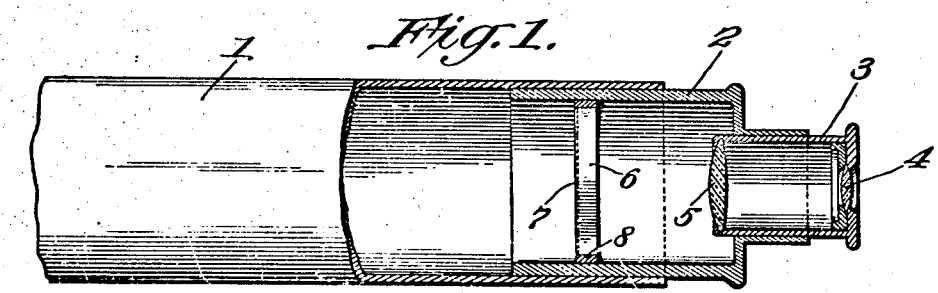
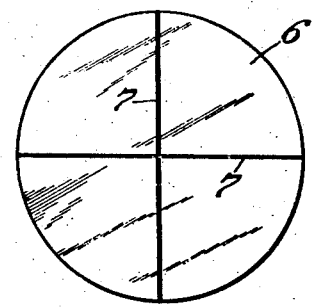
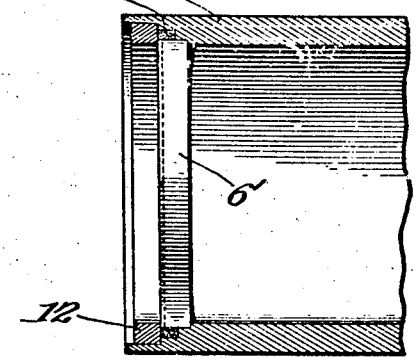
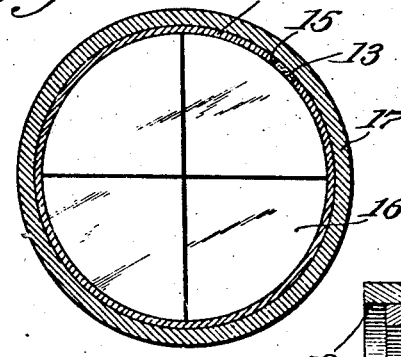
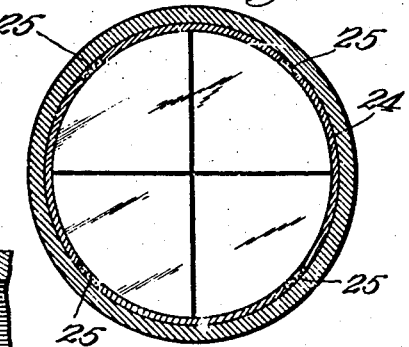
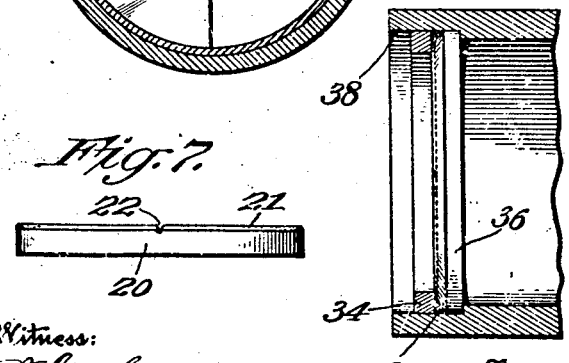
Inventor
Conrad Friedrich

UNITED STATES PATENT OFFICE.

CONRAD FRIEDRICH, OF WASHINGTON, DISTRICT OF COLUMBIA.

LUMINOUS HAIR-LINE.

1,302,353.  Specification of Letters Patent.  Patented Apr. 29, 1919.

Application filed September 20, 1917. Serial No. 192,365.

*To all whom it may concern:*

Be it known that I, CONRAD FRIEDRICH, a citizen of the United States, residing at Washington, in the District of Columbia, have invented certain new and useful Improvements in Luminous Hair-Lines, of which the following is a specification.

The present invention relates to hair-lines for optical instruments. It is well known that in optical instruments for establishing definite lines between a point of observation and distant objects the conventional crosshairs acting as fiducial lines are not suited for observations at night. This defect has been remedied by the application of special illuminating devices comprising a battery or other source of electricity, an electric-light bulb, electric connections and sometimes light ray modifying means, such as prisms and lenses. While such devices give complete satisfaction for the purpose for which they are designed, they have the disadvantage that the operation of the optical instrument depends on outside factors which may fail at any moment and make the instrument useless.

This invention has for its general object the provision of means for visualizing symbols, lines of reference or other lines of demarcation on a transparent body which, in the absence of a sufficient quantity of light passing it, are normally not visible.

The more particular object of the invention is the provision of a luminous hair-line system which is self-contained within an optical instrument and not liable to become suddenly inoperative.

Another object of the invention is the provision of a hair-line system that may be used by day and night without any change on the instrument or any action on the part of the observer.

I accomplish the purpose and attain the objects of the invention by providing on a glass plate or other transparent body means for defining a hair-line or hair-lines of such characteristics as to be distinctly visible when illuminated by a radium-luminous material, radium-luminous compound or other luminous radio-active material.

For a fuller understanding of the invention reference is had to the appended drawings in which—

Figure 1 shows the application of my invention to a telescope;

Fig. 2 one form of the device embodying the invention;

Fig. 3 another form thereof;

Figs. 4 and 5 modifications of the form shown in Fig. 3;

Fig. 6 another modification thereof; and

Fig. 7 illustrates a method for forming the hair-lines on a glass plate.

In Fig. 1, which represents the ocular end of a telescope, 1 is the main tube of the telescope, 2 the ocular tube, 3 the adjustable section thereof carrying the lenses 4 and 5 and 6 a circular glass plate or other transparent disk fixedly supported in the tube 2. This plate 6 is mounted in a ring 8 as is usual, and the position is such that for the normal position of the adjustable section 3 the glass plate is substantially in the focal plane of the lens system 4, 5. I preferably provide hair-lines or cross-lines by forming grooves 7 of exceedingly small width and depth in the face of plate 6.

I have found that when such grooves are brought under the influence of radium in the form of luminous radium salts or radium-luminous compounds, as for instance zinc sulfid mixed with radium, they emit light rays and appear to the eye as luminous lines of substantially the width of the grooves.

It is understood that, when the intensity of the light admitted through the objective end of the telescope or otherwise passing the hair-lines thus formed is greater than that of the light emitted by the hair-lines, the latter appear relatively dark by contrast. When, however, the quantity of light received through the objective is comparatively small, as at night, the luminosity of the hair-lines preponderates to such an extent that they stand out distinctly by contrast and perform their function as hair-lines or cross-hairs as efficiently as by day.

The grooves 7 may be brought under the influence of radium-luminous material in various ways. One simple way is indicated in detail in Fig. 2. The grooves 7 are formed in that face of plate 6 which is turned toward the objective or away from the ocular end and filled with a radium-luminous compound to any desired degree. In such case the luminous compound is directly visible. The amount or quantity of such compound determines, for grooves of the same character, the degree of luminosity, whereby I have a simple means for controlling the brilliancy of the hair-lines. I have found, however, that the character of the grooves affects the brilliancy of the hair-lines also. A groove that has a roughened or relatively serrated surface affords greater luminosity than one having a comparatively smooth surface. While, of course, the dimensions dealt with are minute, it is quite possible to control to a certain extent the qualities or character of the grooves in that respect by the process of making them.

Instead of placing the radium-luminous material in the grooves 7, I may place it on the periphery of the glass disk 6, as shown in Fig. 3. The glass disk 6' is shown mounted in the tube 10. Adjacent the periphery of the disk 6' the tube 10 is provided with a circular recess or channel 11 to receive the radium-luminous compound in powdered form. An abutting ring 12 is tightly fitted against the glass disk 6' to hold it in place and simultaneously close the open side of the recess 11 to thereby secure the radium-luminous compound in place. In this case the rays of light emanating from the luminous material are reflected from the walls of the grooves in the form of a narrow band.

Instead of confining the radium-luminous material in the recess 11 mechanically separate from the glass disk 6', the luminous material may be attached to the glass body itself in the form of a coat or may be coated on the mount.

In Fig. 3 the radium-luminous material is shown as surrounding the whole periphery of the glass disk 6'. It is sufficient, however, for the operation of my device to place a small quantity on any desired point of the periphery, preferably midway of a quadrant defined by the grooves, as shown in Fig. 4, or on several points, preferably uniformly spaced, as shown in Fig. 5. In Fig. 4, 16 indicates the glass disk, 13 a quantity of radium-luminous material, 14 a ring on which the disk 16 is mounted and 15 a recess in the ring 14 to receive the luminous material 13 which is confined between the periphery of the disk 16, the tube 17 and the walls of the recess 15. In Fig. 5 the ring 24 is shown as provided with four recesses 25 to receive radium-luminous material.

In Fig. 6 the glass disk 36 is shown as beveled along its periphery so that the radium-luminous material may be confined in the space defined by the bevel surface 37, the wall of the tube 38 and the ring 34.

There is considerable latitude as to the disposition of the radium-luminous material. While perhaps a more uniform distribution of the luminous material is conducive to a more perfect illumination, the disposition made as shown in Fig. 4 gives entirely satisfactory results.

In fact the position of the luminous material may be changed at will so long as the grooves or equivalent means can be brought under its influence.

In the execution of the invention shown in Figs. 4 and 5 it is advantageous to silver those portions of the periphery which are not covered by the luminous material as in known forms of luminous cross-hairs.

Hair lines formed by grooves and illuminated by electric bulbs are known. However such air lines are incapable of reflecting a sufficient quantity of light to be visible to any practical extent when illuminated by radium-luminous material, because the emissive power of such illuminant is considerably smaller than that of an electric filament. I have found, however, that it is nevertheless possible to produce visible hair lines in the manner indicated by making the grooves sufficiently deep. By ordinary methods it is impossible to make the grooves of sufficient depth to produce practical results.

Fig. 7 illustrates one method of forming relatively deep grooves in a glass body. The plate 20 is first covered with a thin film of acid resisting material 21, preferably transparent bakelite. Then by any suitable means a narrow band 22 of the coating is removed to define a line on the glass plate of the desired width, say .001 inch. This line or band is exposed to the action of hydrofluoric acid as a liquid or vapor. I have found that the best results are obtained by making the time of exposure short, then removing the film of bakelite altogether, recoating the whole surface, removing again a narrow band of the coating in the same position as before and repeating the etching process as before. This cycle of operation may be repeated until the groove formed has the desired characteristics.

While it may be possible to employ other methods for forming relatively deep grooves in a glass body, I have found the process just described as the only solution of the problem. In practice I prefer to use as a protecting coating transparent bakelite lacquer which enables me to make a very thin film on the glass disk, a feature of considerable practical importance.

The cycles of operation are in practice as follows: coating, drawing the lines, exposing to the acid fumes, exposing to ammoniacal fumes to neutralize the acid, washing off the coating and so on.

The time of exposure to the acid I choose as follows:

5 seconds after the first and second coating;
10 seconds after the third coating;
20 seconds after the fourth, fifth and sixth coating.

The glass disk is preferably held ¼" from the surface of the acid.

It is understood that the strength of the acid, the time of exposure and the distance may be varied to some extent, especially for etching different kinds of glass.

By the foregoing description I have not attempted to cover all possible constructions and all available processes for carrying out the objects of my invention. What is described is merely for the purpose of outlining briefly some constructions and one method to explain the principles on which the invention is based. I have referred to grooves in the surface of the glass disk or other transparent body merely as a convenient means for the particular purpose. It is obvious that lines capable of emitting light under the action of a radium-luminous material may be defined by deposition of material on the glass, as for instance by photographic processes which are well understood.

The expression "relatively deep grooves" in the claims is intended to designate grooves whose depth is appreciably greater than that of the grooves heretofore used for defining hair-lines.

I claim:—

1. A luminous sign comprising a transparent body, a relatively deep and narrow groove in a surface thereof defining a hair-line and a radium luminous substance to make said hair-line visible.

2. A body of glass, a relatively deep and narrow groove in a surface thereof defining a hair-line and a radium-luminous substance to make said hair-line visible.

3. A glass plate, having a relatively deep and narrow groove in a surface thereof defining a hair-line and a radium-luminous substance disposed along the edge of the said glass plate.

4. A glass disk, a relatively deep and narrow groove in a surface thereof and a radium luminous substance disposed along substantially the whole periphery thereof.

5. The combination with an optical instrument, of a transparent body, relatively deep and narrow grooves in a surface thereof defining hair-lines and a radium luminous substance to make said hair lines visible.

6. The combination with an optical instrument, of a glass plate, a relatively deep and narrow groove in a surface thereof defining a line of reference and a radium-luminous substance to make said line visible.

7. The combination with an optical instrument, of a glass plate in an image plane thereof, a relatively deep and narrow groove in a surface thereof to define a hair-line and a radium-luminous substance to make said hair-line visible.

9. The combination with an optical instrument, of a glass plate in an image plane thereof, relatively deep and narrow grooves in a surface thereof to define hair-lines and a radium-luminous substance distributed along the edge of the plate to make said hair-lines visible.

9. The combination with an optical instrument, of a glass disk in an image plane thereof, relatively deep and narrow grooves in a surface thereof to define hair-lines and a radium-luminous substance distributed along the periphery of said disk to make said hair-lines visible.

10. The combination with an optical instrument including a tubular body, of a glass plate in the tubular body, relatively deep and narrow grooves in the plate, a recess adjacent the edge of the glass plate, and radium-luminous material in said recess.

In testimony whereof, I affix my signature.

CONRAD FRIEDRICH.